United States Defensive Publication [19] (H) [11] T969,004

Watkiss [43] Apr. 4, 1978

[54] LIGHT-ABSORBING FILTERS

[75] Inventor: Bruce Martin Watkiss, Welwyn, England

[73] Assignee: Imperial Chemical Industries Limited, London, England

[21] Appl. No.: 792,502

[22] Filed: May 2, 1977

[30] Foreign Application Priority Data

May 10, 1976 United Kingdom ..... 19105/76

[51] Int. Cl.[2] ..... G03C 5/04; G03B 5/20; G03B 15/02

[52] U.S. Cl. ..... 96/27 R; 350/1.1; 362/11

[57] ABSTRACT

Light-absorbing filters comprise a self-supporting polymeric film, such as an oriented polyethylene terephthalate film, containing or coated with a lacquer containing a compound which absorbs light in the wavelength band less than 0.4 μm (i.e. UV light). The filters are particularly useful as UV-absorbing filters for use in flashbulbs for color photography. Suitable light-absorbing compounds are hydroxyphenyl benzotriazoles, e.g. 2(2′-hydroxy-3′,5′-di-t-amylphenyl)benzotriazole, and hydroxy-substituted benzophenone, e.g. 2,2′-dihydroxy-4,4′-dimethoxy-benzophenone.

11 Claims, No Sheets Drawing,

10 Pages Specification

The file of this unexamined application may be inspected and copies thereof may be purchased (849 O.G. 1221, Apr. 9, 1968).